United States Patent [19]
Brown et al.

[11] Patent Number: 5,520,586
[45] Date of Patent: May 28, 1996

[54] ADAPTIVE CONTROL FOR AUTOMATIC TRANSMISSION ENGAGEMENT

[75] Inventors: Larry T. Brown; Marvin P. Kraska, both of Dearborn, Mich.

[73] Assignee: Ford Motor Company, Dearborn, Mich.

[21] Appl. No.: 467,256

[22] Filed: Jun. 6, 1995

[51] Int. Cl.⁶ .................................................. F16H 61/06
[52] U.S. Cl. ............................................. 475/120; 475/131
[58] Field of Search .................................. 475/120, 131; 477/117, 176

[56] References Cited

U.S. PATENT DOCUMENTS

| | | | |
|---|---|---|---|
| 4,527,678 | 7/1985 | Pierce et al. | 192/3.58 |
| 4,970,916 | 11/1990 | Narita | 364/424.1 |
| 5,046,178 | 9/1991 | Hibner et al. | 477/117 |
| 5,249,483 | 10/1993 | Iizuka | 477/117 |
| 5,385,511 | 1/1995 | Iizuka | 477/117 |

*Primary Examiner*—Dirk Wright
*Attorney, Agent, or Firm*—Frank G. McKenzie; Roger L. May

[57] ABSTRACT

A system for controlling engagement of forward drive and reverse drive when a gear selector lever is moved from park or neutral position and for adapting the control on the basis of the slip across the oncoming friction element includes an automatic transmission, gearing friction elements that control the gearing, a valve body containing shift valve solenoids for operating the shift valves and control algorithms executed by a microprocessor, a gear selector lever, a throttle position sensor, shaft speed sensors, and transmission input and output shafts. The clutch pressure increases linearly under the control of a closed-loop system. A control algorithm senses when the closed-loop control is operative and automatically changes the period during which clutch pressure is maintained at a high magnitude prior to engagement so that the resulting gear change is smooth and occurs at maximum speed.

14 Claims, 4 Drawing Sheets

ADAPTIVE CONTROL FOR AUTOMATIC TRANSMISSION ENGAGEMENT

BACKGROUND OF THE INVENTION

1. Field of the Invention

This invention pertains to the field of automatic transmission controls.

2. Description of the Prior Art

In an automatic transmission, when the operator moves the range selector lever from the neutral or park position to forward or reverse position, the proper friction element is engaged or applied to produce the selected operating range. This engagement must be accomplished in a smooth manner to prevent noise, vibration, and harshness. However, this engagement must occur rapidly so that the transmission is fully engaged when the operator depresses the engine throttle, in order to prevent a slip-bump distrubance.

In an automatic transmission, forward drive and reverse drive engagement occur when the vehicle operator moves the shift selector lever from the park or neutral positions to a forward drive range or reverse drive range position. Conventionally, the oncoming friction element, which produces the selected drive ratio when engaged, is stroked briefly to take up clearances in the friction element, whereafter clutch pressure is increased so that the oncoming friction element is fully engaged within a fixed period.

If the oncoming friction element pressure increases too quickly, then a harsh engagement can occur. If the oncoming friction element pressure increases too slowly, then the friction element may not be fully engaged when the vehicle operator depresses the engine throttle pedal, thereby producing a slip-bump disturbance.

SUMMARY OF THE INVENTION

In order to avoid these difficulties, the control system according to the present invention includes an adaptive control algorithm that continually monitors slip across the oncoming friction element and compares that slip to a reference slip recorded when the adaptive control is first initiated. When slip has increased by a predetermined amount, a slip command is applied to decrease the input shaft speed in a controlled closed-loop manner. A variable force solenoid is used to control the oncoming clutch pressure in response to a slip error, which is passed through a PID controller to regulate the oncoming friction clutch.

It is an object of this invention to provide an adaptive controller to improve engagement of an automatic transmission and improve noise vibration and harshness of the engagement while accomplishing the engagement at an optimum speed.

In realizing these objectives, the method, according to this invention, for controlling engagement of an automatic transmission adapted for connection to a power source having a driven shaft, the transmission having a range selector, a turbine shaft hydrokinetically connected to the driven shaft, input shaft, output shaft, gearing for changing the speed of the output shaft relative to the input shaft, friction element for controlling the gearing, and solenoid-actuated shift valve through which the friction element is engaged and released, includes moving the range selector to a non-drive range; determining the magnitude of reference slip between the input shaft and driven shaft while the range selector is in said non-drive range; moving the range selector to a drive range; continually determining the magnitude of slip while the range selector is in said drive range; pressurizing the friction element at a relatively high constant pressure for a precharge period having a fixed length portion and an adaptive length portion; if slip exceeds reference slip during the precharge period, reducing the length of the adaptive period for a later engagement of the transmission following movement of the range selector to a drive range from a non-drive range.

Then slip is increased continually by controlling the magnitude of pressure in the friction element under closed-loop control until the friction element is fully engaged.

However, if slip does not exceed reference slip during the precharge period, the method includes pressurizing the friction element after the precharge period at a relatively lower constant pressure for a first period having a predetermined length; if slip does not exceed reference slip during the first period, continually increasing pressure of the friction element until slip exceeds reference slip; and increasing the length of the adaptive period for a later engagement of the transmission following movement of the range selector to a drive range from a non-drive range.

DETAILED DESCRIPTION OF THE PREFERRED EMBODIMENT

Figure 1:
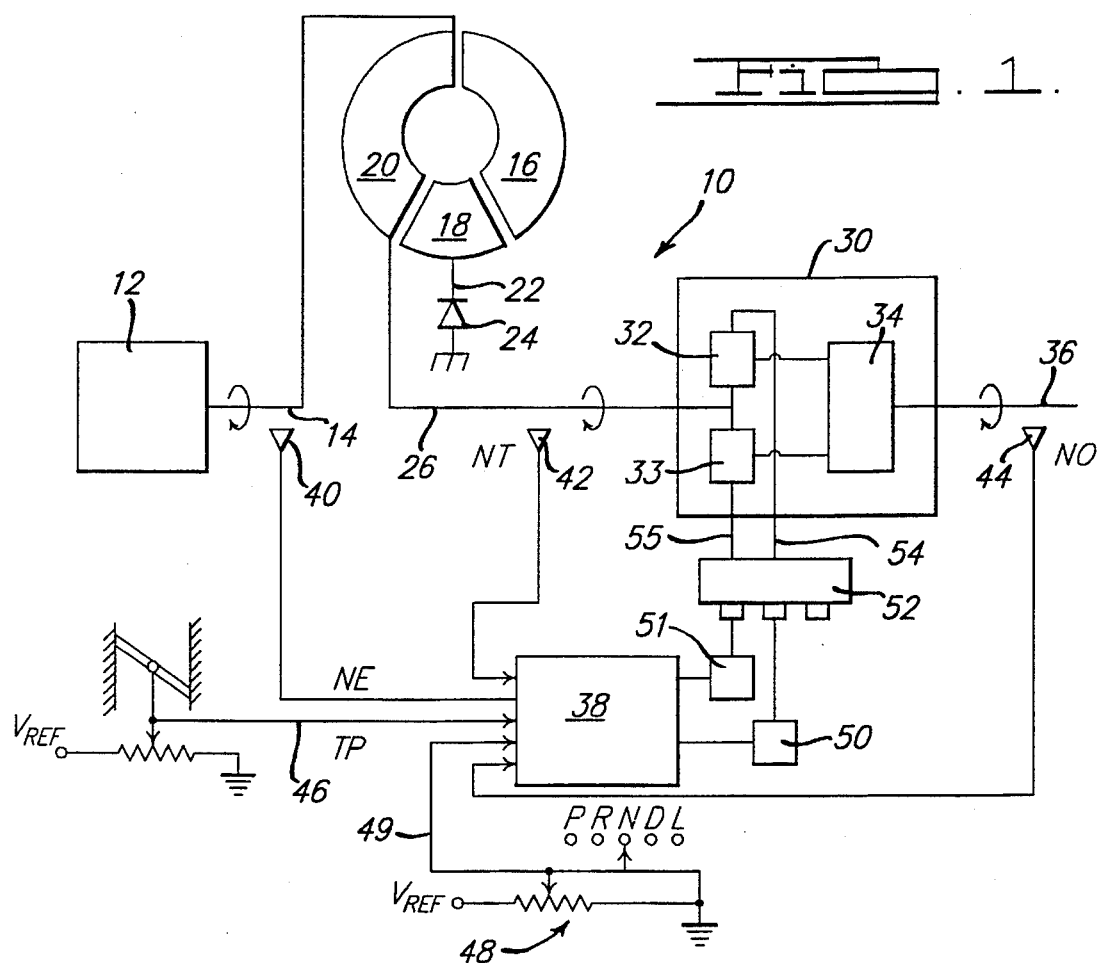
FIG. 1 is a schematic diagram of a powertrain to which the control of the present invention can be applied.

Referring first to FIG. 1, the powertrain 10 includes an IC engine 12 whose crankshaft 14 is driveably connected to the impeller wheel 16 of a torque converter 18 having a turbine wheel 20 adapted for hydrokinetic connection to the impeller and a stator wheel 22 supported rotatably on the transmission casing by a one-way clutch 24. The turbine is driveably connected to the input shaft 26 of a transmission 30, which includes hydraulically actuated friction clutches and/or brakes 32, 33, whose engagement and disengagement determine the gear ratio and operating range produced by a gear set 34. The transmission has an output shaft 36 driveably connected to the drive wheels of the vehicle.

A shift control unit, in the form of an electronic microprocessor or microcontroller 38, has input ports connected to various shaft speed sensors, including engine speed sensor 40, which produces a signal representing the speed NE of the engine; sensor 42, which produces a signal representing the speed of the input shaft and turbine shaft NT; and sensor 44, which produces a signal representing the output shaft speed NO. A signal representing the position of a throttle pedal or throttle position TP, which controls engine manifold conditions, is carried on line 46 to the microprocessor 38. Output shaft speed NO is proportional to vehicle speed. A signal representing the position of a PRNDL gearshift lever 48, moved manually by the vehicle operator to select the operating range of the automatic transmission, is produced by a PRNDL sensor and carried on line 49 to an input port of the microprocessor 38.

Output signals produced by the shift control unit 38 are carried to variable force solenoids or pulse-width-modulated solenoids 50, 51. Valve body 52 contains shift control valves that open and close communication between a fluid pressure source and the friction elements in response to the signals applied to the solenoids. As the valves open and close, hydraulic lines 54, 55 are supplied with pressurized fluid or vented, thereby engaging and disengaging the oncoming and offgoing friction elements 32, 33, whose operating states determine the gear ratio produced by gear set 34.

U.S. Pat. No. 4,938,097, owned by the assignee of the present invention, describes an automatic transmission, friction clutches, brakes, gear set and one-way clutch operative during coast braking conditions. The transmission described in that patent is an example of the transmission 30.

Figure 2:
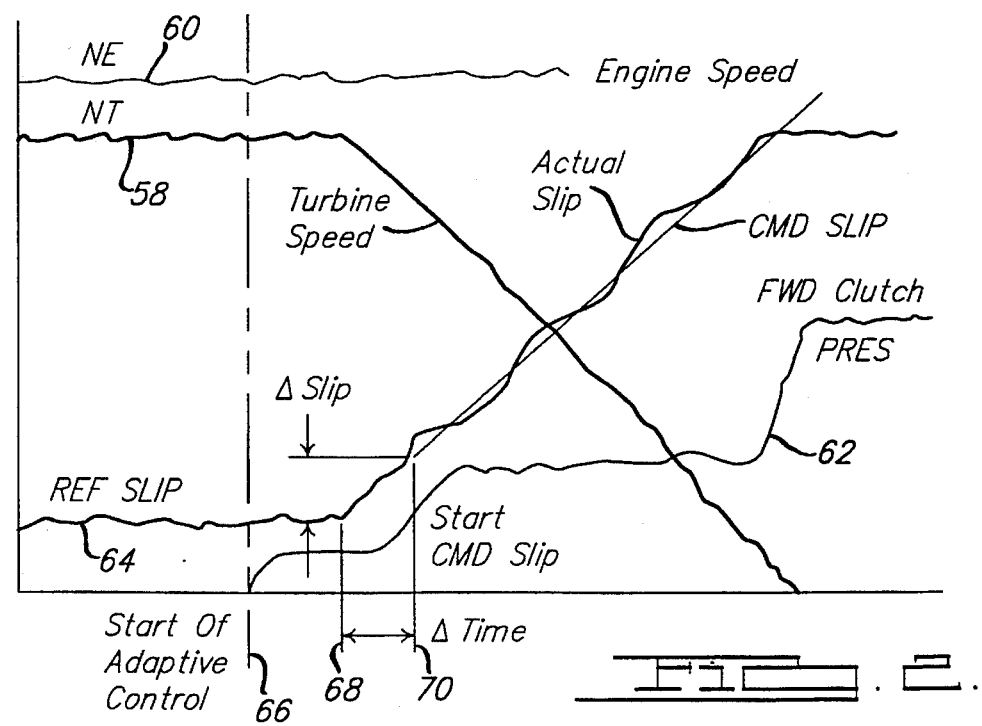
FIG. 2 is a graph representing the variation of several parameters before and during engagement of an automatic transmission under the control of the present invention.

Referring now to FIG. 2, while the sensor 48 is located in a neutral detent or park detent position, the NT, or input speed 58, is slightly lower than NE, engine speed 60. Later, turbine speed decreases as the pressure in the oncoming friction element, here the forward clutch pressure 62, increases. This invention will be described with reference to forward gear engagement, which results from engagement of a forward clutch, but the invention is equally applicable to reverse drive, which results from engagement of a reverse clutch.

While the lever is in the neutral detent or park detent position, SLIP REF 64, the difference between NE and NT, is at some initial value and will increase during the engagement process, as described below.

When the lever is moved from neutral or park to a forward detent (D, L, R), the microprocessor issues a signal commanding engagement of the forward clutch or reverse clutch, corresponding to the position to which the lever has been moved.

Figure 3:
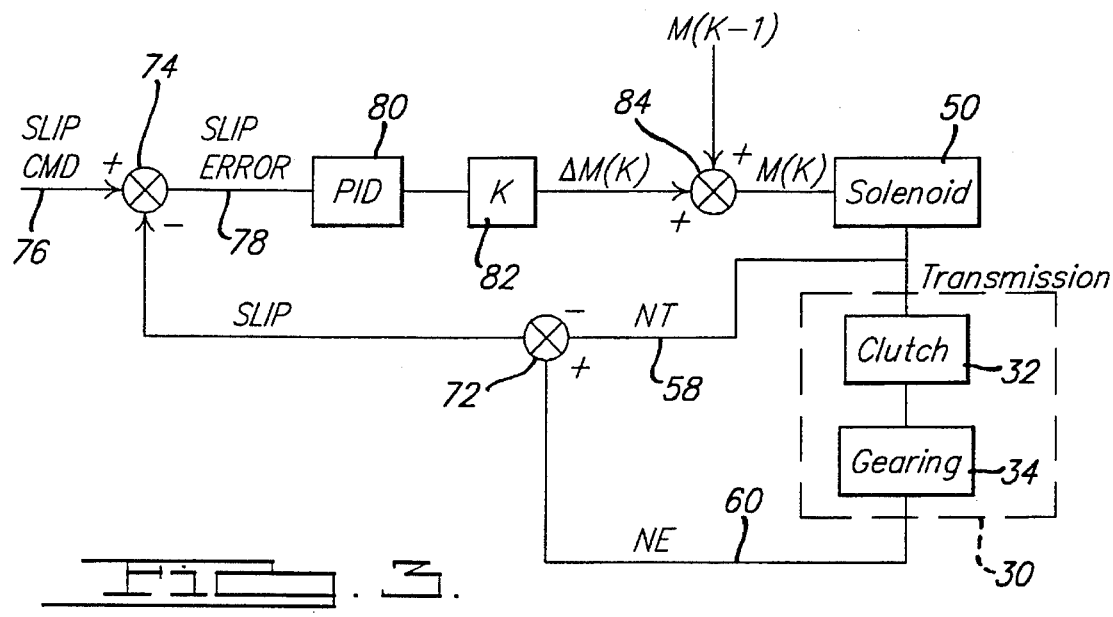
FIG. 3 is a schematic diagram illustrating a feedback control for use with the present invention.

The start of the adaptive control strategy begins at the point in time represented by vertical line 66, which corresponds substantially to movement of the range selector lever 48 from park or neutral to a forward or reverse drive position. A value of reference slip, QEF SLIP, is recorded and stored in electronic memory at the start of the adaptive control 66. After the adaptive control is initiated, the forward clutch pressure 62 is increased to a high commanded value PH (FIG. 4) so that the forward clutch is stroked taking up clearances among the friction elements, and disposing the clutch at the threshold for carrying torque. Next, clutch pressure command is stepped down to PL. After this occurs, input shaft speed, or turbine speed 58, starts to decrease and slip begins to increase above SLIP REF. When slip has increased by a predetermined amount, the microprocessor issues a slip command at 70, which causes a decrease in turbine speed in a controlled closed-loop manner, described next with reference to FIG. 3.

The difference between turbine speed 58 and engine speed 60 is produced as output of summing junction 72. That slip is carried to summing junction 74 where the commanded slip 76 is combined algebraically with actual slip to produce a slip error, which is passed on line 78 to a PID controller 80 to regulate the forward clutch pressure and ensure smooth engagement. The output of controller 80 is passed through a gain 82, which produces a signal representing a change in duty cycle $\Delta M(K)$. Here, a variable force solenoid 50 is used to control forward clutch pressure in response to the slip error. At summing junction 84, the change in duty cycle is added to the immediately previous duty cycle M(K-1) to produce total duty cycle M(K), which is the signal supplied to solenoid 50. The magnitude of hydraulic pressure in clutch 32 is regulated by the duty cycle applied to solenoid 50 by opening and closing a source of regulated hydraulic pressure through a shift valve controlled by the solenoid in response to the duty cycle. As a result of this, gearing 34 produces the first foward speed ratio when the forward clutch 32 is engaged. FIG. 2 shows actual slip following commanded slip, CMD SLIP, and the variation of forward clutch pressure 62 during the engagement process.

Figure 4:
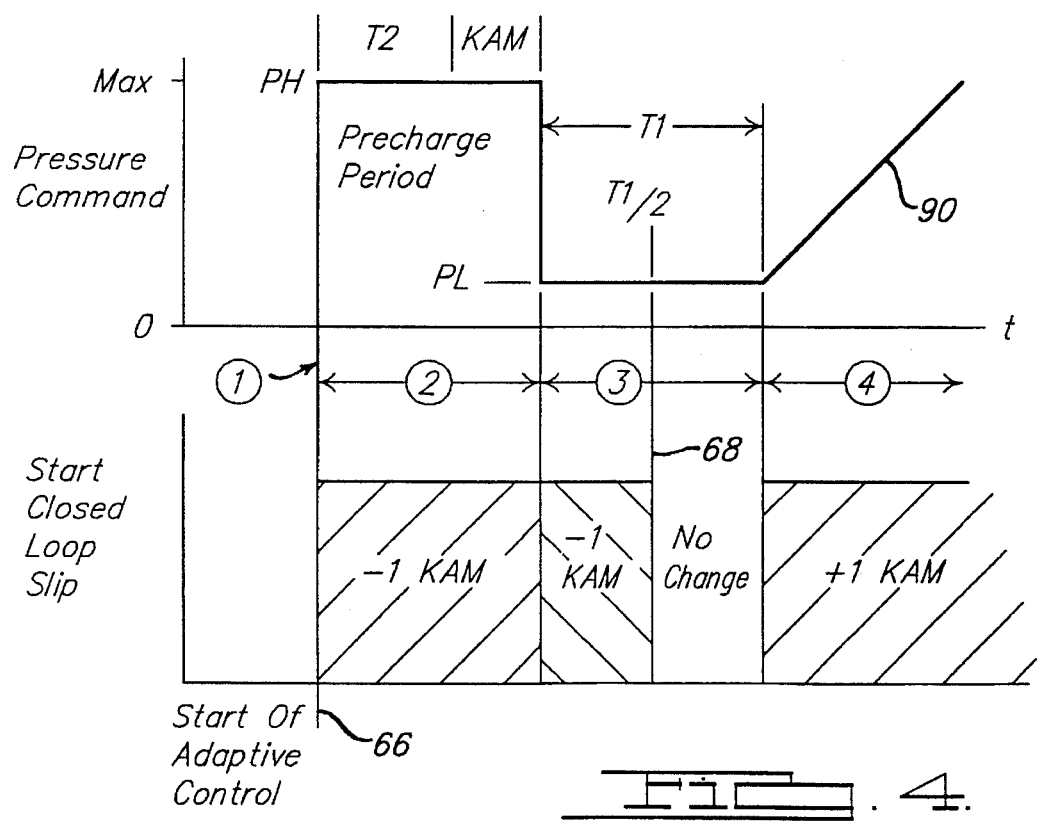
FIG. 4 is a graph showing friction element pressure and a variable, COUNT, during transmission engagement control according to the present invention.

An adaptive control algorithm is used in conjunction with the closed-loop slip controller to ensure smooth but fast engagements. FIG. 4 shows the variation over time of the oncoming friction element pressure during various control phases 1–4 of engagement of the friction element, and certain counts associated with the control phases. At the start of the adaptive control process at 66, the pressure command to the VFS solenoid 50 produces a maximum value pressure PH. This action ensures maximum flow into the forward clutch and therefore fast pressurization. If the forward clutch pressure rises too fast, then a harsh engagement will occur because the slip error will rise too fast for the closed-loop controller to control the oncoming friction element pressure correctly. If the forward clutch pressure increases too slowly, then the danger of the clutch not being applied at the instant the vehicle operator depresses the engine throttle increases. An adaptive algorithm to overcome these difficulties is described next with reference to FIG. 4.

After the precharge period, which comprises periods T2 and KAM, the forward clutch pressure is reduced to PL, which magnitude is just sufficient to start the engagement process, i.e., to cause the forward clutch to carry torque. The precharge period consists of two parts, T2, which is a fixed period, and KAM, which is the adaptive period. The length of KAM is adjusted depending on when active closed-loop slip control starts. The length of the third phase, T1, represents the period following the precharge period during which pressure in the forward clutch is reduced to PL from the precharge magnitude PH.

If actual slip is greater than SLIP REF during the precharge period, so that closed-loop control is required during phases 1 or 2, the gear engagement is rough because forward clutch pressure is too high. In order to correct this problem, the control algorithm decreases KAM by one execution of a middle ground pass. The reduced KAM value is effective during the next succeeding engagement of the forward clutch that occurs under control of the algorithm. The period required for one execution of a middle ground pass of the transmission control software is approximately 0.016 sec. The effect changes the magnitude of KAM to determine the number of consecutive executions of a middle ground pass that have occurred. The variable COUNT is compared to another variable, NSSL, at appropriate times during execution of the control algorithms.

If the precharge period is insufficiently long to cause slip to increase, the control algorithm reduces forward clutch pressure to PL and maintains that pressure level for a predetermined period T1. If, however, slip increases during the period first half of T1, the gear engagement occurs too close to the precharge period; therefore, the control algorithm decrements KAM by one unit.

If slip increases during the second half the T1 period represented by phase 3 in FIG. 4, the change in slip is attributed to the magnitude PL and no change in KAM is required. Therefore, the next execution of the control algorithm during a succeeding engagement of the forward clutch occurs with the current value of KAM, as it did during the previous gear engagement.

If slip does not increase during period T1 so that closed-loop control does not occur during phase 4, KAM is increased by one middle ground pass for the next engagement of the forward clutch.

Increasing or decreasing the adaptive period KAM, changes the pressurization rate in the oncoming friction element. If the rate is too high, closed-loop control occurs in phase 1 or 2 or the first half of phase 3 and the engagement will be harsh. If closed-loop control occurs in phase 4, gear engagement is too slow, and a slip-bump disturbance may occur. If closed-loop control begins in the second half of phase 3, the process is sufficiently fast and smooth and no time correction is required. The adaptive time KAM is stored in keep-alive memory and is updated for every gear engagement. This procedure involves a learning process with continual improvement and compensation for variability and wear. The duration of the periods represented by phases 1–4 are calibrated based on speed of the engagement and harshness or smoothness of the engagement perceived by the vehicle operator.

Figures 5, 6:
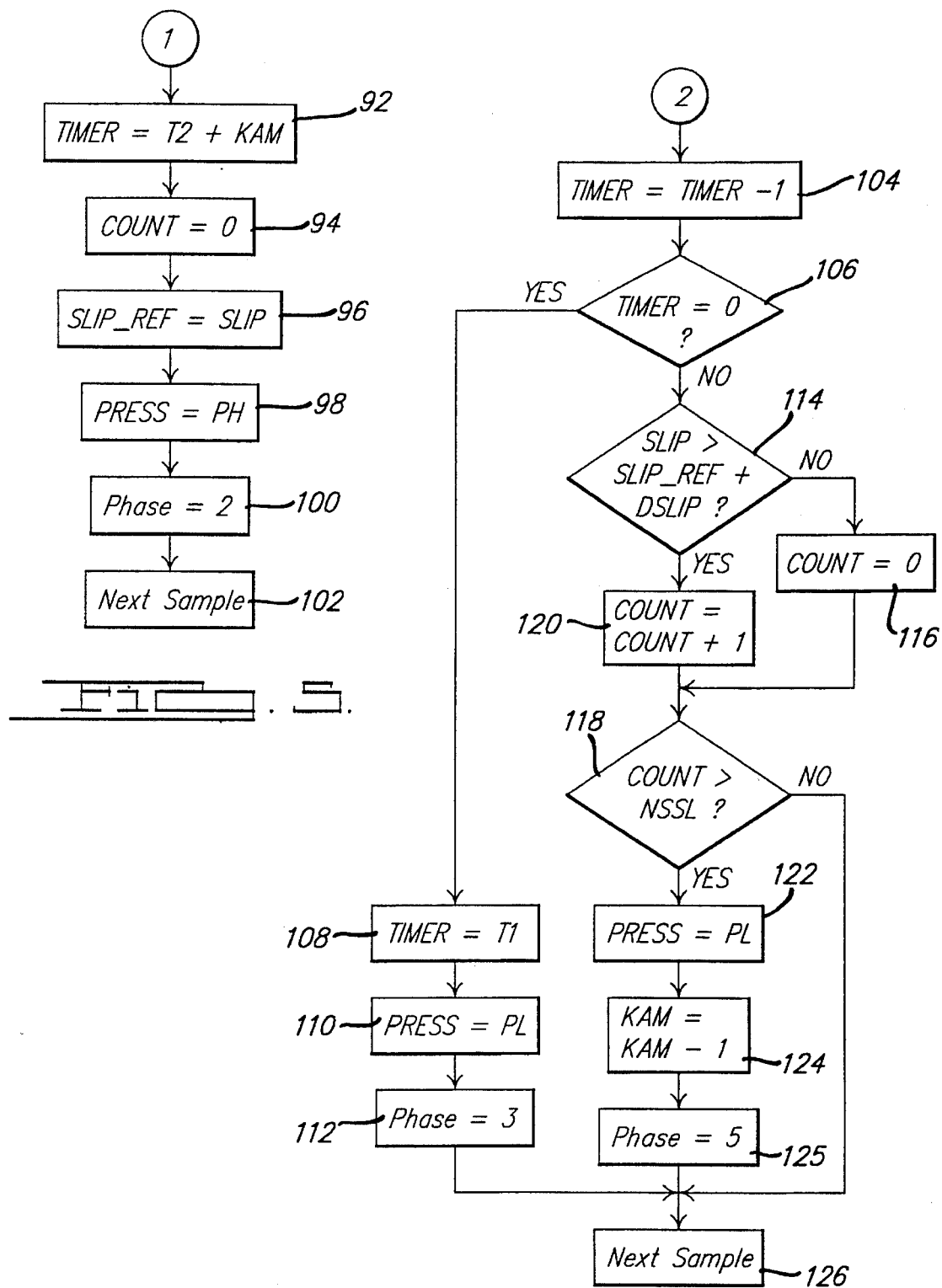
FIGS. 5–7 are diagrams of logic used to control operation of a transmission according to the present invention.
Figure 7:
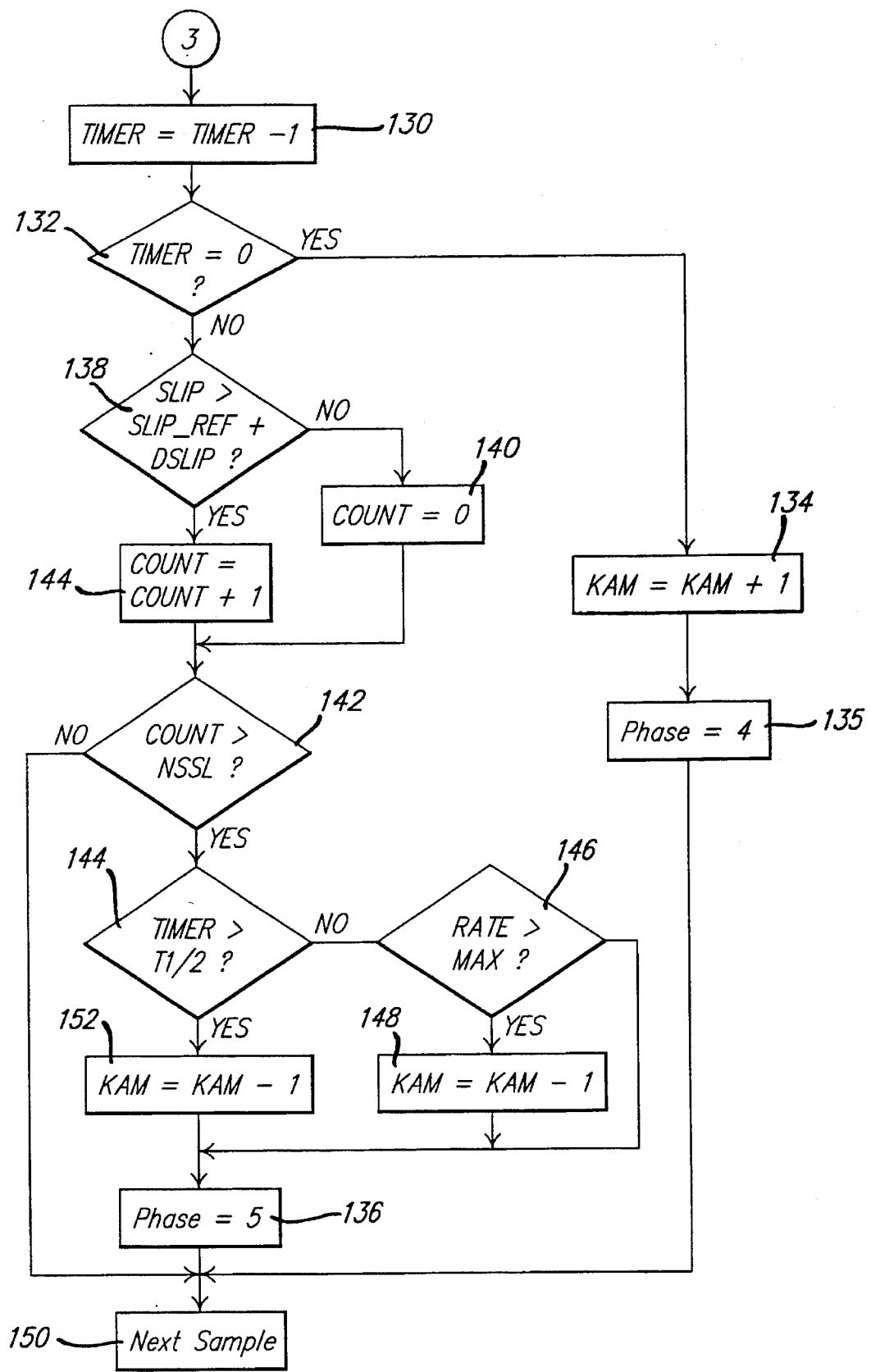

The various phases of the adaptive controller are represented by the control logic of FIGS. 5–7.

Referring first to FIG. 5, at 92 a timer is initialized during phase 1 to the magnitude T2+KAM, COUNT is initialized at 94, reference slip is set equal to actual slip at 96, and forward clutch pressure is commanded to the high magnitude PH at 98. The magnitude of PH is approximately 100 psi and is a calibrated value established empirically to a sufficiently magnitude required to stroke the oncoming friction element. At 100, PHASE is set equal to 2 and the next sample data is taken at 102.

During execution of a portion of the control algorithm related to PHASE 2, at 104 the countdown TIMER is set equal to TIMER-1 and an inquiry is made at 106 to determine whether TIMER is equal to zero. If the test at 106 is true, thereby indicating that the precharge period has elapsed without slip changing, at 108 TIMER is reset to T1, the oncoming friction clutch pressure is commanded to the low magnitude PL at 110, and PHASE is set equal to 3 at 112.

If the test at 106 is false, an inquiry is made at 114 to determine whether SLIP is greater than SLIP REF+DSLIP, which is calibrated value established so that the comparison to SLIP is in an acceptable range. If the comparison 114 is false, COUNT is set equal to zero at 116 and control passes to the comparison at 118. If the comparison at 114 is true, at 120 COUNT is incremented.

At 118, COUNT is compared to a calibrated constant NSSL, whose magnitude is established to assure noise immunity and slip verification. If comparison 118 is true, indicating that slip has increased above the reference magnitude, oncoming clutch pressure is decreased to PL at 122, the adaptive period KAM is decreased by one at 124, and control passes to PHASE 5, during which the closed-loop control is executed to produce the slip up-ramp. Next, sample data is taken at 126. If comparison 118 is negative, the control stays in phase 2 until TIMER elapses or until SLIP increases above the reference magnitude. Thereafter, sample data is read at 126.

Referring now to FIG. 7 where the logic for controlling operation in phase 3 is illustrated, countdown TIMER is decremented at 130. Thereafter, at 132, a test is made to determine whether TIMER is equal to zero. If TIMER has expired, thereby indicating that slip has not increased and the engagement has taken too long, KAM is increased by one count at 134 to increase the precharge period during the next engagement of the forward clutch under this control strategy. The oncoming friction element is increased on ramp 90 in accordance with an open-loop control, represented by PHASE, box 135.

If test 132 is negative, an inquiry is made at 138 to determine whether SLIP is greater than SLIP REF+DSLIP. If test 138 is negative, COUNT is set equal to zero at 140 and control passes to test 142. If test 138 is true, at 144, COUNT is incremented by one unit.

At 142, a test is made to determine whether COUNT is greater than the calibrated value representing a predetermined number of successive counts, NSSL, that will avoid noise-related difficulties. If 142 is true, at 144 the magnitude of TIMER is compared to T1/2 to determine whether current time is in the first or second half of phase 3. If test 144 is negative, indicating control is currently in the second half of phase 3, a test is made at 146 to determine whether the rate of change of slip, RATE, is greater than a calibrated value, MAX, established empirically to produce a smooth gear ratio of change. If the comparison 146 is true, KAM is decremented at 148 and control passes to the phase 5 closedd-loop controller at 136, described with reference to FIG. 3, and then to the next sample at 150. If the engagement occurs with an acceptable rate, test 146 is false and control passes to the phase 5 closed-loop controller at 136 without altering the magnitdue of KAM. If test 142 is negative, control passes to 150 without altering the magnitude of KAM.

If test 144 is true, KAM is decremented by one unit at 152, and control passes thereafter to 136, the phase 5 closed-loop controller.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for controlling engagement of an automatic transmission adapted for connection to a power source having a driven shaft, the transmission having a range selector, a turbine shaft hydrokinetically connected to the driven shaft, input shaft, output shaft, gearing for changing the speed of the output shaft relative to the input shaft, and friction element for controlling the gearing, comprising:

moving the range selector to a non-drive range;

determining the magnitude of reference slip between the input shaft and driven shaft while the range selector is in said non-drive range;

moving the range selector to a drive range;

continually determining the magnitude of slip while the range selector is in said drive range;

pressurizing the friction element at a relatively high constant pressure for a precharge period having a fixed length portion and an adaptive length portion;

if slip exceeds reference slip during the precharge period, reducing the length of the adaptive period for a later engagement of the transmission following movement of the range selector to a drive range from a non-drive range.

2. The method of claim 1 further comprising:

increasing slip continually by controlling the magnitude of pressure in the friction element under closed-loop control until the friction element is fully engaged.

3. The method of claim 1 further comprising:

if slip does not exceed reference slip during the precharge period, pressurizing the friction element after the precharge period at a relatively lower constant pressure for a first period having a predetermined length;

if slip does not exceed reference slip during the first period, continually increasing pressure of the friction element until slip exceeds reference slip; and increasing the length of the adaptive period for a later engagement of the transmission following movement of the range selector to a drive range from a non-drive range.

4. The method of claim 1 further comprising:

if slip does not exceed reference slip during the precharge period, pressurizing the friction element after the precharge period at a relatively lower constant pressure for a first period having a predetermined length;

if slip exceeds reference slip during a later portion of the first period, increasing slip continually by controlling the magnitude of pressure in the friction element under closed-loop control until the friction element is fully engaged;

maintaining constant the length of the adaptive period for a later engagement of the transmission following movement of the range selector to a drive range from a non-drive range.

5. The method of claim 1 further comprising:

if slip does not exceed reference slip during the precharge period, pressurizing the friction element after the precharge period at a relatively lower constant pressure for a first period having a predetermined length;

if slip exceeds reference slip during a early portion of the first period, increasing slip continually by controlling the magnitude of pressure in the friction element under closed-loop control until the friction element is fully engaged; and decreasing the length of the adaptive period for a later engagement of the transmission following movement of the range selector to a drive range from a non-drive range.

6. The method of claim 3 further comprising increasing slip continually by controlling the magnitude of pressure in the friction element under closed-loop control until the friction element is fully engaged.

7. The method of claim 4 further comprising:

decreasing the length of the adaptive period for a later engagement of the transmission following movement of the range selector to a drive range from a non-drive range, if the rate of change of slip exceeds a predetermined rate of slip.

8. A system for controlling engagement of an automatic transmission adapted for connection to a power source having a driven shaft, comprising:

a range selector indicating a selected drive range and non-drive range;

a turbine shaft hydrokinetically connected to the driven shaft;

an input shaft and output shaft;

gearing for changing the speed of the output shaft relative to the input shaft;

a friction element whose state of engagement and disengagement controls the gearing;

a solenoid-actuated shift valve through which the friction element is pressurized to engage the friction element and is vented to disengage the friction element;

means for determining the magnitude of reference slip between the input shaft and driven shaft while the range selector is in said non-drive range;

means for continually determining the magnitude of slip while the range selector is in said drive range;

means for pressurizing the friction element at a relatively high constant pressure for a precharge period having a fixed length portion and an adaptive length portion;

means for reducing the length of the adaptive period for a later engagement of the transmission following movement of the range selector to a drive range from a non-drive range, if slip exceeds reference slip during the precharge period.

9. The system of claim 8 further comprising:

closed loop controller means for increasing slip continually by controlling the magnitude of pressure in the friction element until the friction element is fully engaged.

10. The system of claim 8 further comprising:

means for pressurizing the friction element after the precharge period at a relatively lower constant pressure for a first period having a predetermined length, if slip does not exceed reference slip during the precharge period;

means for continually increasing pressure of the friction element until slip exceeds reference slip, if slip does not exceed reference slip during the first period; and means for increasing the length of the adaptive period for a later engagement of the transmission following movement of the range selector to a drive range from a non-drive range.

11. The system of claim 8 further comprising:

means for pressurizing the friction element after the precharge period at a relatively lower constant pressure for a first period having a predetermined length, if slip does not exceed reference slip during the precharge period;

means for increasing slip continually by controlling the magnitude of pressure in the friction element under closed-loop control until the friction element is fully engaged, if slip exceeds reference slip during a later portion of the first period;

means for maintaining constant the length of the adaptive period for a later engagement of the transmission following movement of the range selector to a drive range from a non-drive range.

12. The system of claim 8 further comprising:

means for pressurizing the friction element after the precharge period at a relatively lower constant pressure for a first period having a predetermined length, if slip does not exceed reference slip during the precharge period;

closed-loop controller means for increasing slip continually by controlling the magnitude of pressure in the friction element under closed-loop control until the friction element is fully engaged, if slip exceeds reference slip during a early portion of the first period; and means for decreasing the length of the adaptive period for a later engagement of the transmission following movement of the range selector to a drive range from a non-drive range.

13. The system of claim 10 further comprising means for increasing slip continually by controlling the magnitude of pressure in the friction element under closed-loop control until the friction element is fully engaged.

14. The system of claim 11 further comprising:
means for decreasing the length of the adaptive period for a later engagement of the transmission following movement of the range selector to a drive range from a non-drive range, if the rate of change of slip exceeds a predetermined rate of slip.

* * * * *